Figure 1:
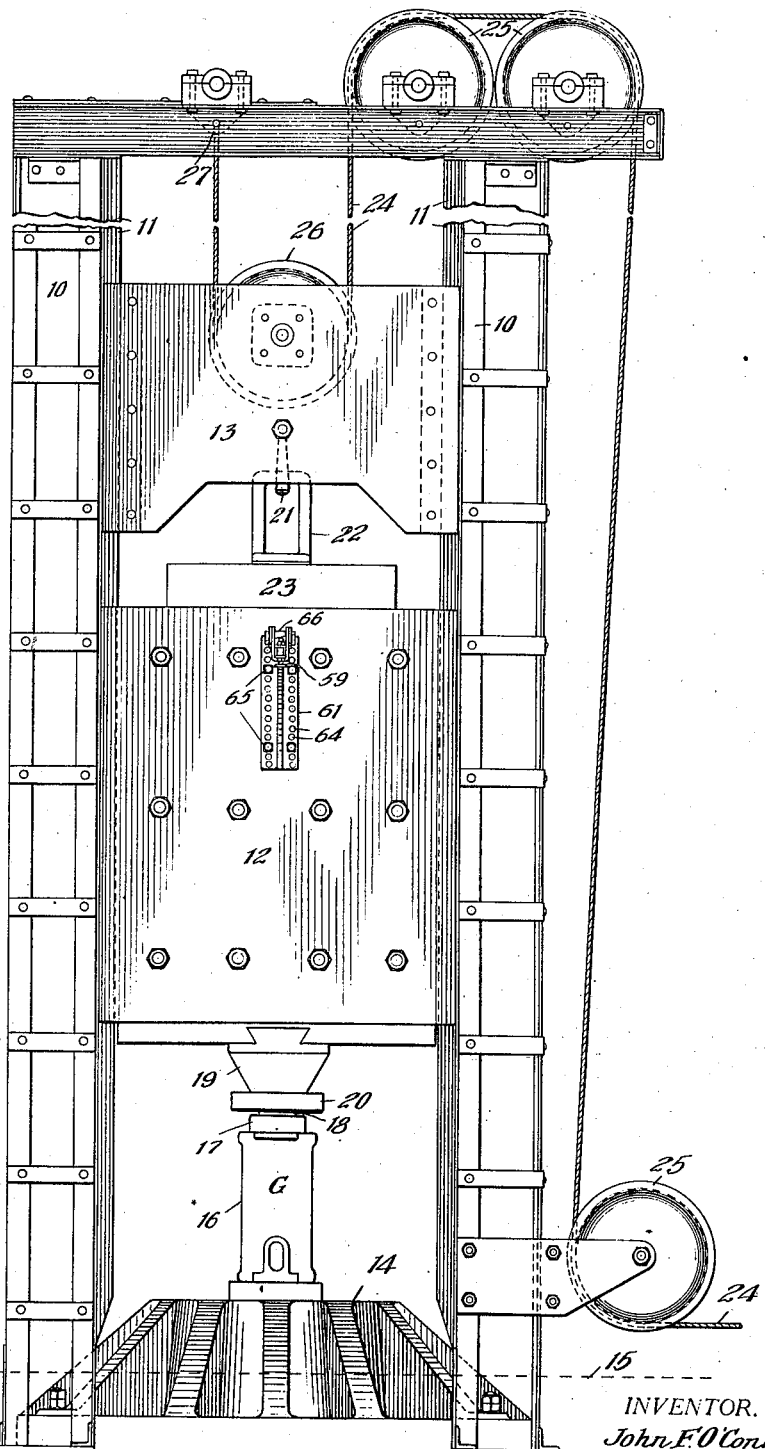

J. F. O'CONNOR.
MEANS FOR RECORDING ACTIONS OF RAILWAY DRAFT GEARS.
APPLICATION FILED JULY 6, 1915.

1,217,984.

Patented Mar. 6, 1917.
7 SHEETS—SHEET 1.

WITNESS
Wm. Geiger

INVENTOR.
John F. O'Connor
BY George J. Haight
ATTORNEY

J. F. O'CONNOR.
MEANS FOR RECORDING ACTIONS OF RAILWAY DRAFT GEARS.
APPLICATION FILED JULY 6, 1915.

1,217,984.

Patented Mar. 6, 1917.
7 SHEETS—SHEET 2.

WITNESS
Wm. Geiger

INVENTOR.
John F. O'Connor
BY
ATTORNEY

J. F. O'CONNOR.
MEANS FOR RECORDING ACTIONS OF RAILWAY DRAFT GEARS.
APPLICATION FILED JULY 6, 1915.
1,217,984.
Patented Mar. 6, 1917.
7 SHEETS—SHEET 3.
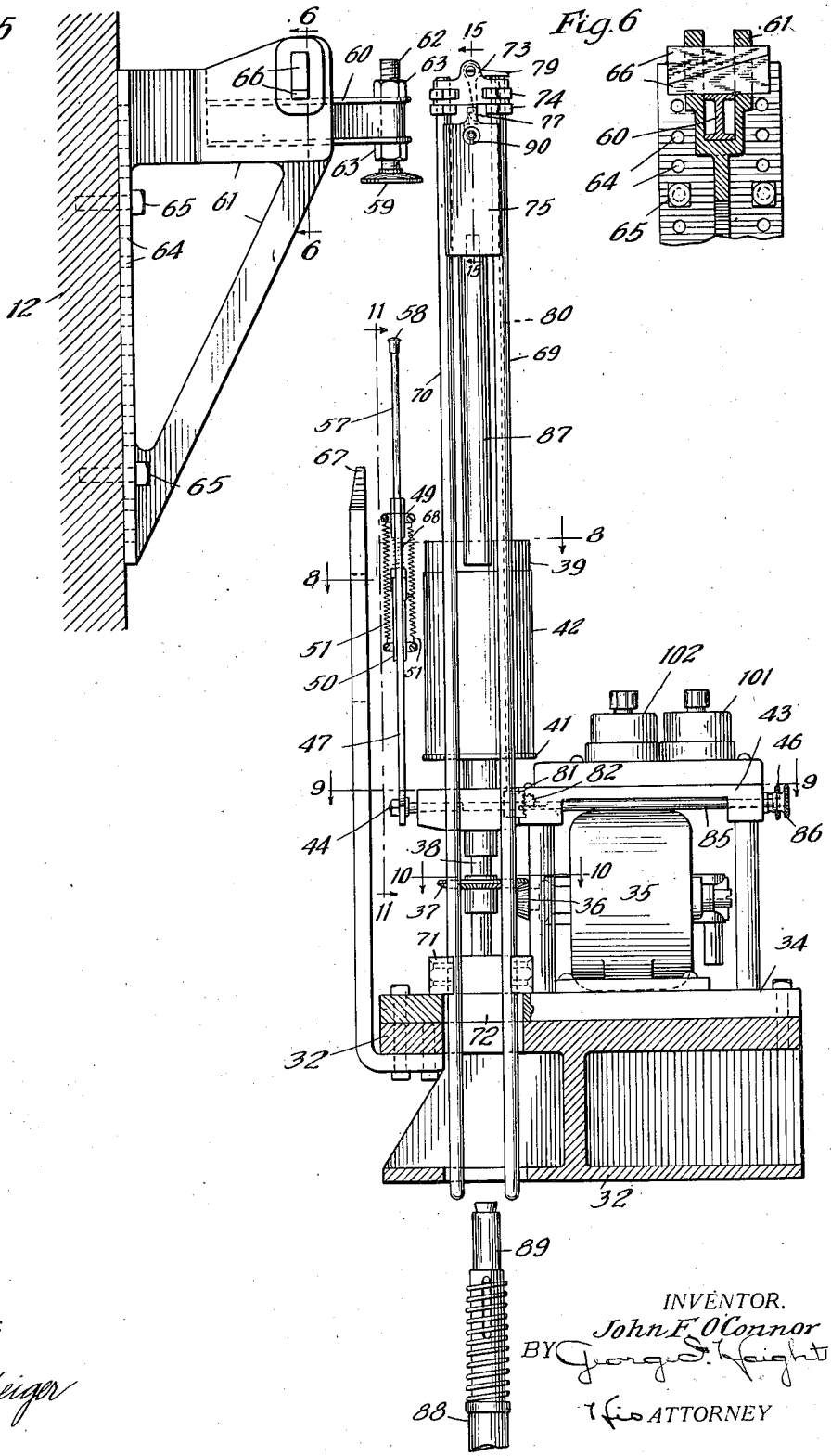
WITNESS
Wm. Geiger
INVENTOR.
John F. O'Connor
BY 
ATTORNEY J. F. O'CONNOR.
MEANS FOR RECORDING ACTIONS OF RAILWAY DRAFT GEARS.
APPLICATION FILED JULY 6, 1915.
1,217,984.
Patented Mar. 6, 1917.
7 SHEETS—SHEET 4.
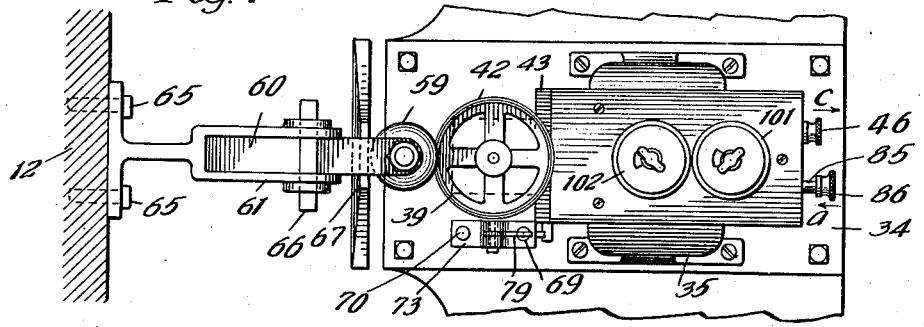
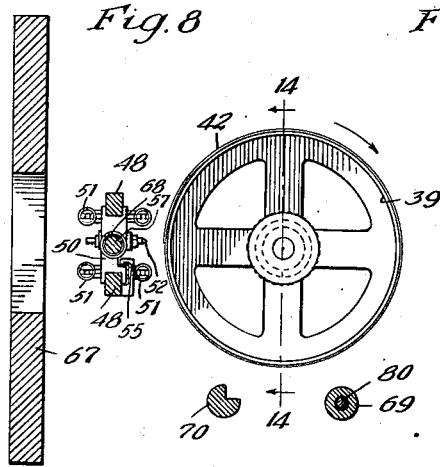
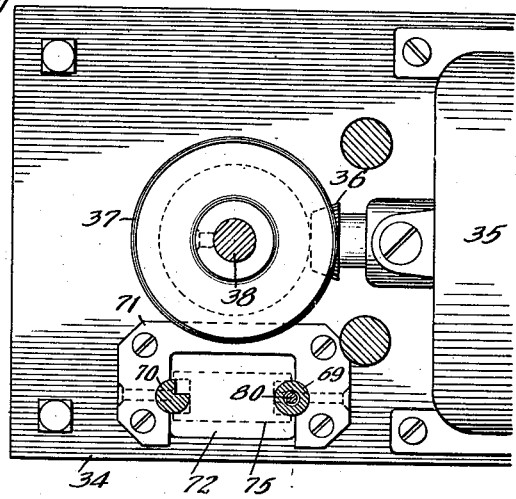
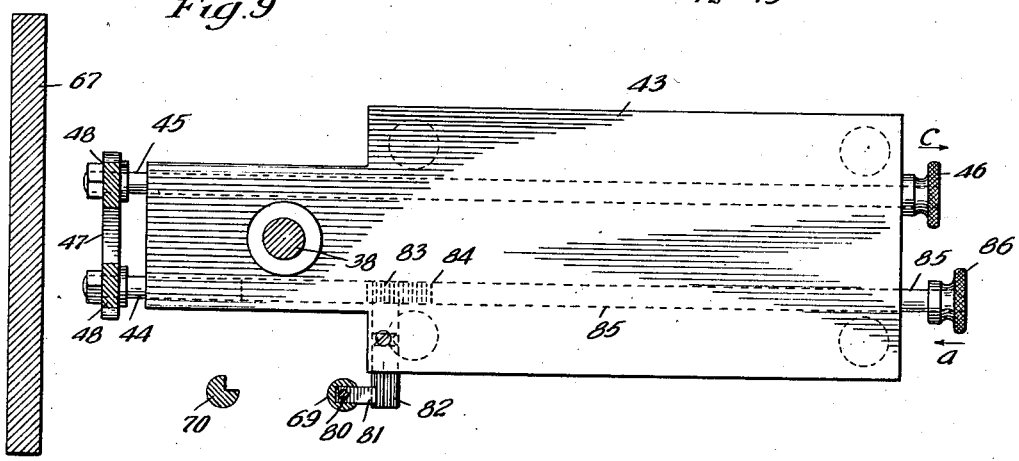
WITNESS
Wm. Geiger
INVENTOR.
John F. O'Connor
BY George I. Haight
his ATTORNEY J. F. O'CONNOR.
MEANS FOR RECORDING ACTIONS OF RAILWAY DRAFT GEARS.
APPLICATION FILED JULY 6, 1915.
1,217,984.
Patented Mar. 6, 1917.
7 SHEETS—SHEET 5.
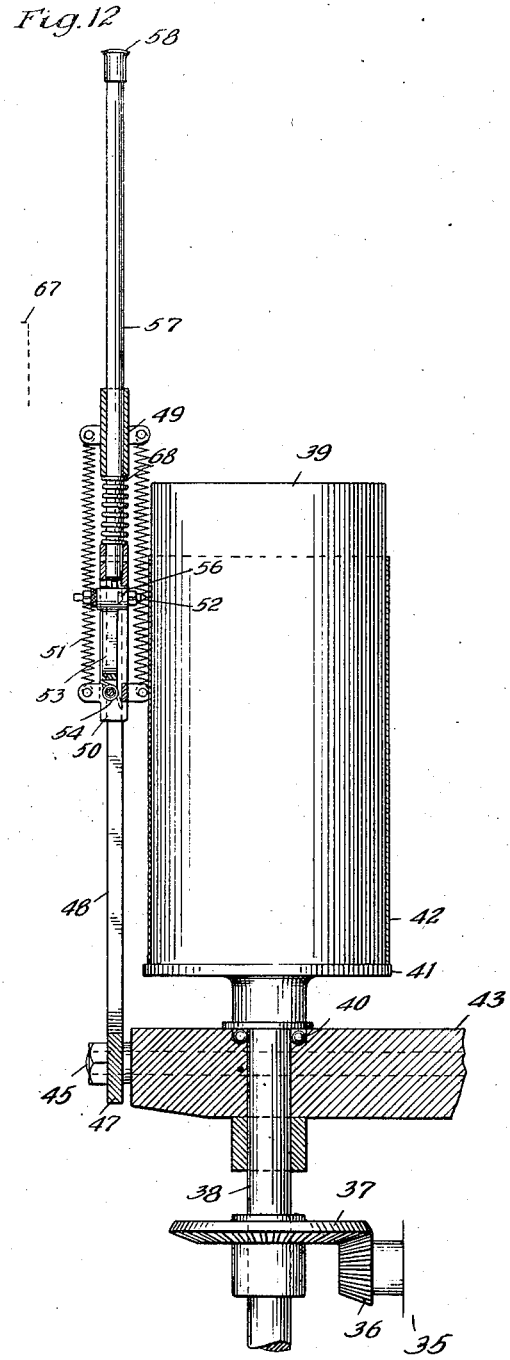
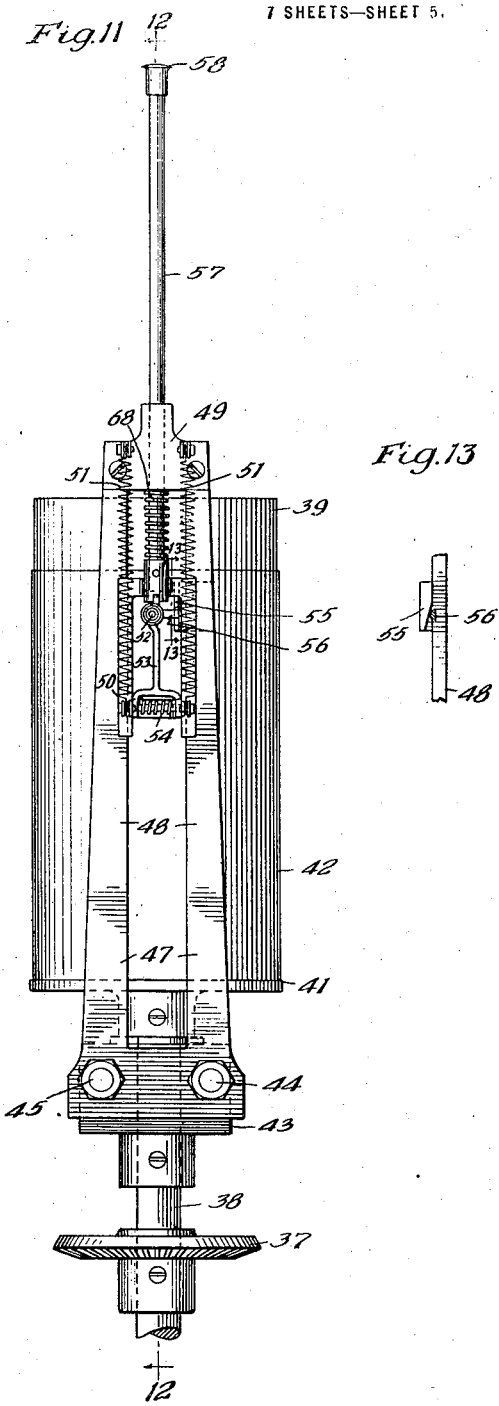
WITNESS
Wm. Geiger
INVENTOR.
John F. O'Connor
BY George D. Haight
ATTORNEY J. F. O'CONNOR.
MEANS FOR RECORDING ACTIONS OF RAILWAY DRAFT GEARS.
APPLICATION FILED JULY 6, 1915.
1,217,984.
Patented Mar. 6, 1917.
7 SHEETS—SHEET 6.
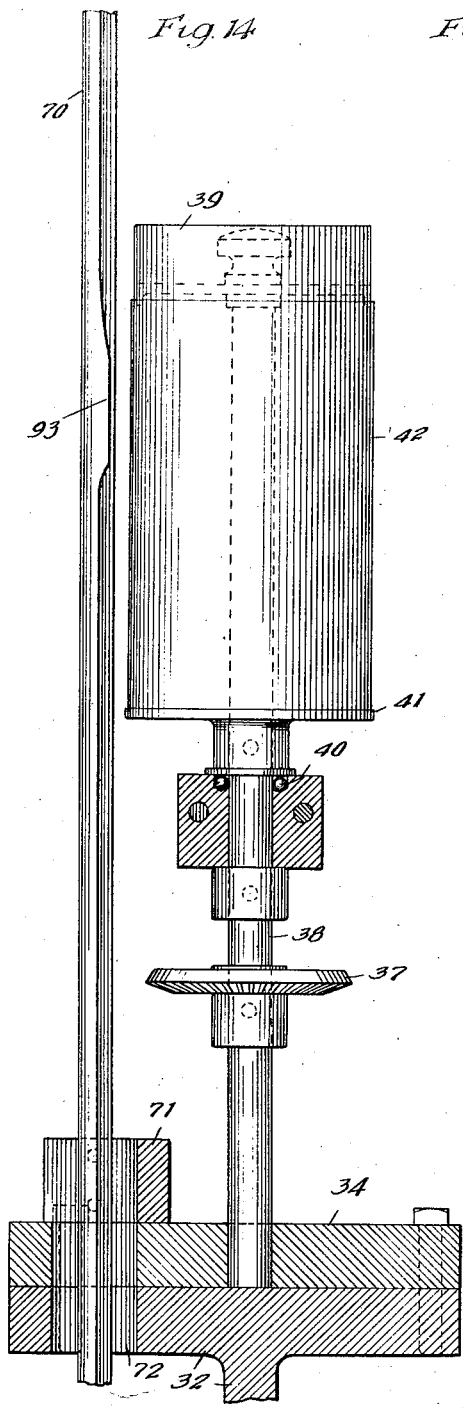
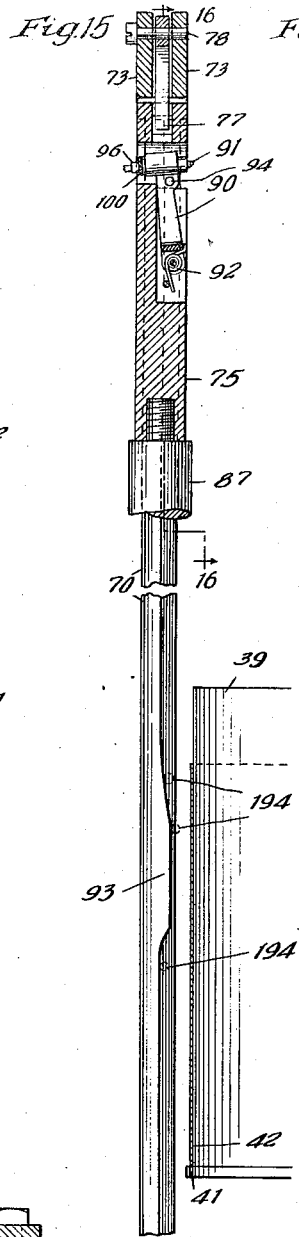
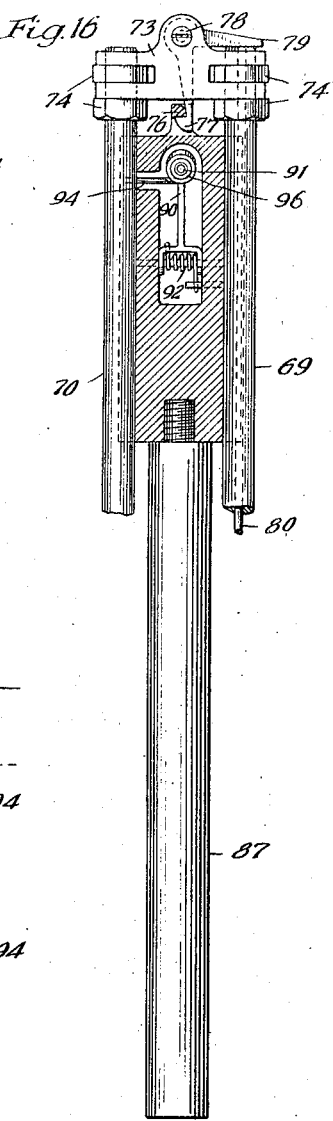
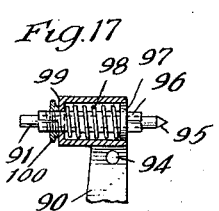
INVENTOR.
John F. O'Connor
BY
ATTORNEY J. F. O'CONNOR.
MEANS FOR RECORDING ACTIONS OF RAILWAY DRAFT GEARS.
APPLICATION FILED JULY 6, 1915.

1,217,984.

Patented Mar. 6, 1917.
7 SHEETS—SHEET 7.

WITNESS
Wm. Geiger

INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

MEANS FOR RECORDING ACTIONS OF RAILWAY DRAFT-GEARS.

1,217,984.     Specification of Letters Patent.     Patented Mar. 6, 1917.

Application filed July 6, 1915. Serial No. 38,111.

*To all whom it may concern:*

Be it known that I, JOHN F. O'CONNOR, a citizen of the United States, residing at Chicago, in the county of Cook and State of Illinois, have invented a certain new and useful Improvement in Means for Recording Actions of Railway Draft-Gears, of which the following is a full, clear, concise, and exact description, reference being had to the accompanying drawings, forming a part of this specification.

This invention relates to improvements in means for recording actions of railway draft gears.

As is well known, draft gears for railway cars are required to absorb enormous shocks in an exceedingly small space of time, in actual service. Heretofore, so far as I am aware, no means have ever been devised for recording the actual work being performed by a railway draft gear at any instant during its exceedingly rapid operation nor has it been possible to compare the actual working performances of different gears or of different types of gears during their actuation. Heretofore, the methods generally employed of comparing draft gears either of the same or of different types has been limited to the drop hammer test or by the slow application of pressure. These methods, however, do not determine the rate of retardation of the blow or the shock absorbing capacity of the gear at any particular instant in its actuation or the time required to absorb a shock of any particular force or the changes in its operation during the actuation of the gear.

The blows or shocks which a draft gear is required to absorb may vary anywhere from a few thousand pounds to 400,000 or 500,000 pounds, or even more, and the time within which this blow must be absorbed and transmitted to the underframe of the car is infinitesimal, requiring as I have determined, generally less than a tenth of a second.

The object of my invention is to provide simple, accurate, automatically operated mechanism for registering or recording the entire action of the gear from the beginning of the blow or shock until the same has been entirely absorbed, and also during the recoil or recovery and return to normal or substantially normal position of the parts during the extremely short interval in which the action occurs.

Another object of the invention is to provide means utilizing the influence of gravity, and therefore insuring absolutely uniform results, for determining with a fine degree of accuracy the speed or rate of movement of recording elements of the mechanism during the short interval of time in which the record is made.

Another object of the invention is to provide a recording instrument of the type above outlined, which is adapted to be operated in conjunction with the well known drop hammer which is utilized for striking the blows on the draft gears.

The invention furthermore consists of the improvements in the parts and devices and in the novel combinations of the parts and devices herein shown, described or claimed.

Figures 2, 3, 4:
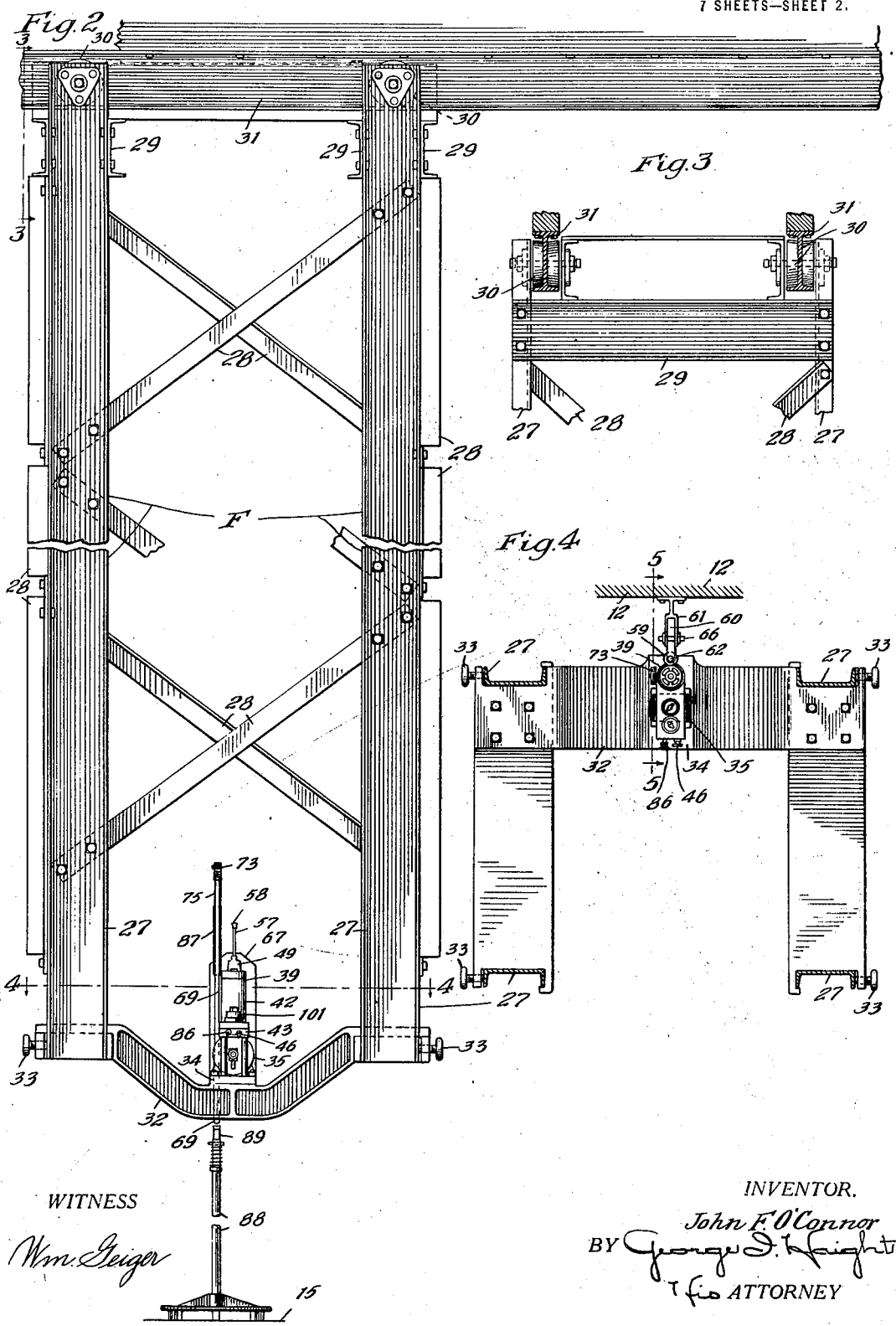
Figure 18:
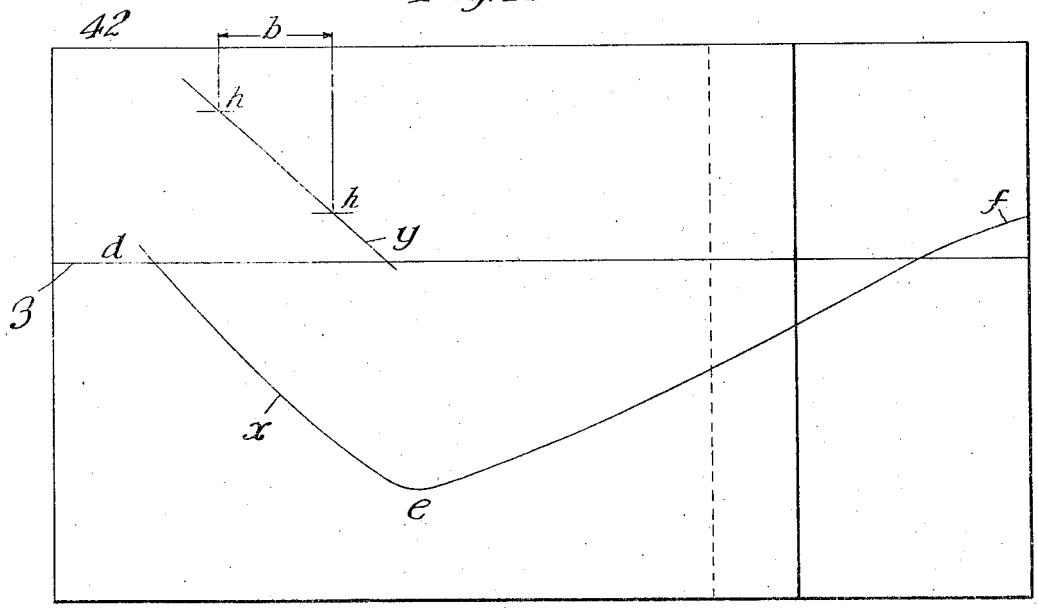
Figure 19:
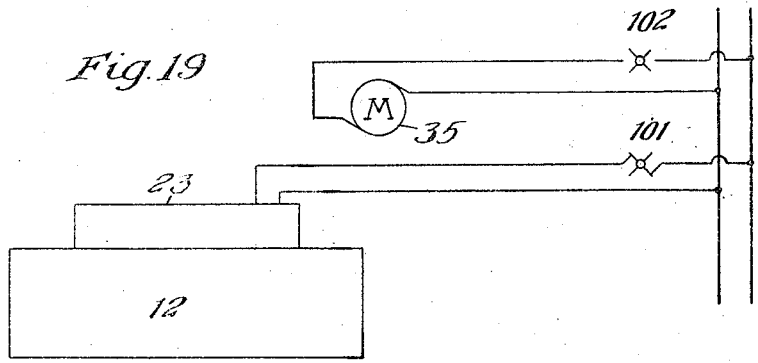

In the drawing forming a part of this specification Figure 1 is a front elevation of the drop hammer such as is employed in the testing of draft gears, a draft gear being shown in position and some of the elements being shown which are attached to the hammer or weight that are employed in conjunction with my improvements. Fig. 2 is a front elevation of the movable frame on which my improved recording mechanism is supported. Fig. 3 is a transverse vertical section of the structure illustrated in Fig. 2 and taken substantially on the line 3—3 thereof. Fig. 4 is a horizontal sectional view taken substantially on the line 4—4 of Fig. 2. Fig. 5 is an enlarged detail vertical sectional view taken substantially on the line 5—5 of Fig. 4. Fig. 6 is a vertical detail sectional view taken substantially on the line 6—6 of Fig. 5. Fig. 7 is a top plan view, the hammer being shown in section, of the structure illustrated in Fig. 5. Figs. 8, 9 and 10 are horizontal sectional views taken respectively on the lines 8—8, 9—9 and 10—10 of Fig. 5, the sections being upon a somewhat enlarged scale. Fig. 11 is an elevational view upon an enlarged scale, of the recording cylinder and associated parts taken substantially on the lines 11—11 of Fig. 5. Fig. 12 is a vertical sectional view taken on the line 12—12 of Fig. 11. Fig. 13 is a sectional view taken on line 13—13 of Fig. 11. Fig. 14 is a vertical sectional view taken substantially on the line 14—14 of Fig. 8. Fig. 15 is a view similar to Fig. 14 but taken at a higher point and substantially on the line 15—15 of Fig. 5. Fig. 16 is a vertical sectional view substantially at right angles to that shown in Fig. 15 and taken on the lines 16—16 thereof. Fig. 17 is a detail sectional view showing one of the pencils employed in the recording device. Fig. 18 is a diagrammatic view illustrating a typical record, taken by my improved mechanism, of the operation of a friction gear when a blow is applied thereto and Fig. 19 is a diagrammatic view illustrating certain of the electrical wiring employed in controlling the magnet for the weight and the motor for the recording mechanism.

Referring more particularly to Fig. 1 illustrating the drop hammer, 10—10 denote vertical posts of any suitable rigid construction which are provided on their inner faces with guides 11—11 for the heavy weight or hammer 12 and lifting head 13. The bed plate or base is shown at 14, the same being preferably partly embedded in concrete, the floor line of which is indicated by the dotted line 15. In said figure, G represents a friction gear of a well known type, the same comprising a shell 16 resting upon the bed plate 14, friction shoes 17 and wedge 18, it being understood that a spring or springs are contained within the cylinder 16 to resist the movement of the shoes and wedge. For a detail description of a friction gear illustrative of the type shown in the drawing, reference may be had to my prior Patent No. 1065070 issued June 17, 1913.

To the underside of the weight 12 is secured a hardened block 19 which receives the wear when the blows are struck on the gear, a plate or follower 20 preferably being placed on the top of the gear to receive the blow from the falling weight. Connected with the member 13 by means of links 21 and 22 is an electromagnet 23 by which the hammer or weight 12 is adapted to be lifted. For raising the member 13 magnet 23 and weight 12, a motor (not shown) is provided having a winding drum about which winds the cable 24, the latter passing over or around idler pulleys 25—25 and pulley 26 rotatably mounted on the member 13, the end of the cable being suitably secured to the upper part of the frame work 27.

In operation, the member 13 is lowered with its magnet 23 until the latter engages the top of the weight 12. Thereupon, the magnet 23 is energized and the motor operated to wind up the cable 24, thus lifting the member 13, magnet 23 and weight 12. The weight is raised above the top face of the plate 20 to the desired height, depending upon the blow desired to be struck. At the desired time, the current to the electromagnet 23 is cut off thereupon releasing the weight 12 and permitting it to fall under the influence of gravity. The weight in pounds of the weight or hammer 12 being known and the height from which it is permitted to fall, the blow in foot pounds which is struck on the gear may be easily calculated, as will be understood.

It is quite essential in recording or registering the action of the gears under the heavy blows which are struck, to prevent vibration or jarring of the recording mechanism. For this reason I mount the recording mechanism proper, hereinafter described, on a depending built-up frame work F which consists preferably of four channels 27—27 suitably braced by diagonal angles 28 and cross channels 29, said structure being mounted on rollers 30—30 which run on I beams 31 secured to the roof members of the building or laboratory wherein the testing takes place. Adjustably secured to the depending channels 27 is a supporting frame or bed 32 recessed at its corners to fit the channels 27 and adapted to be secured in any adjusted position by set screws 33—33.

From the preceding description, it will be seen that the recording mechanism is entirely supported by a heavy frame from the roof of the building, and hence the jars or vibrations resulting from the enormous blows delivered to the gear G which are finally transmitted to the ground or floor of the building are not communicated to the recording device, and hence the latter is free from all vibration.

The recording mechanism consists, broadly, of two sets of devices, one for automatically recording the movement and action of the weight 12 and hence of the gear G and the other, means for determining with the greatest precision, the speed of rotation of the drum on which the record is made during the making of the record.

Mounted on the supporting plates 32 of the frame F, is a base plate 34 to which is secured a small driving motor 35 the armature of which is provided with a bevel gear 36, (see Fig. 12) the latter meshing with another bevel gear 37 keyed or otherwise secured to a vertical shaft 38. The shaft 38 is mounted in suitable bearings and carries at its upper end a rotating cylinder or recording drum 39, ball bearings 40 being preferably provided to minimize the amount of friction. The cylinder 39 at its lower end is provided with an annular shoulder or rib 41 to insure the proper positioning of the record strip of paper 42 which is slipped over the drum. In practice, the paper 42 is first wound around a separate cylinder of the same size as the cylinder 39, the overlapping edges of the paper strip then glued or stuck together after which the paper tube thus formed is slipped over and onto the cylinder 39, and is tightly fitted to the latter to prevent any possible slippage. Above the plate 34 and also above the motor 35 is fixed a horizontal table 43 through which the shaft 38 is extended as indicated in Figs. 9 and 12. Slidably mounted horizontally in the table 43 are rods 44 and 45, the former being relatively short and the latter extending entirely through the table and having a knob 46 at its outer end. (See Fig. 9). Secured to the inner ends of the rods 44 and 45, which are nearest the hammer or weight 12, is a vertical frame 47. (See Fig. 11). The frame 47 consists of two vertical spaced arms 48—48 connected by a top cross member 49. The vertical arms 48—48 form guide ways for a slidable block or cross head 50, which is normally held in its uppermost position by four springs 51—51, the strength of which is determined as hereinafter described. The cross head 50 carries a pencil or stylus 52 which is mounted in a pivoted arm 53, the arm 53 and pencil 52 being normally held with the pencil in operative position by means of a coiled spring 54. (See Figs. 11 and 12). In its uppermost or normal position, however, the pencil 52 is held in a retracted position, that is, free from any possible contact with the recording strip on the cylinder 39 by means of a cam 55 fixed to one of the arms 48, the lever 53 carrying a finger 56 which engages said cam 55 and thereby retracts the pencil. (See Fig. 13).

Secured to the block or cross head 50 is an upwardly extending rod or plunger 57 which is guided in the cross piece 49. The rod 57 is provided at its upper end with a head 58 which is adapted to be engaged by a plate 59 adjustably mounted in an arm 60 carried in a bracket 61 secured to the front face of the weight 12. (See Figs. 1 and 5). The plate 59 is adjustable by means of its threaded stem 62 and the nuts 63, this means giving a relatively fine adjustment and for a coarser adjustment the bracket 61 is provided with a series of holes 64 through any set of which the attaching bolts 65 for securing it to the weight 12 may be placed. As a precautionary safety device, the arm 60 is secured to the bracket 61 preferably by two wood wedge blocks 66 inserted crosswise of the arm 60. (See Fig. 6). In the event that the weight 12 which carries the striking plate 59, descends lower than is intended, for instance, if a gear is not in place on the bed plate 14, or if the same should fail, the arm 60 will strike the breaker 67 and thereby break the wood wedges 66, the breaker 67 being a heavy plate rigidly secured to the supporting plates 32.

From the preceding description, it will be seen that when the weight 12 falls, the striking plate 59 will engage the rod 57 and thereby force the block or cross head 50 downwardly against the tension of the springs 51. As soon as the pin 56 clears the cam 55, the pencil 52 may then make its mark on the recording strip 42 and if the cylinder 39 is rotating, the pencil 52 will make a line corresponding to that indicated at $x$ in Fig. 18. In this connection, it will, of course, be understood that the frame 47 is pulled into proximity with the cylinder 39 by pulling the knob 46 at those times when it is desired to make the record. Ordinarily, the position of the frame 47 relatively to the cylinder 39 will be as shown in Figs. 5 and 8. When the record is being taken the position of the frame 47 will be as shown most clearly in Fig. 12. The downward movement of the pencil 52 is effected in the manner above described and the upward movement takes place under the influence of the springs 51, it being understood that the rod 57 will follow the upward movement of the weight 12 during the recoil or reaction of the gear, and in order to prevent any shock during the return movement of the pencil 52, a spring 68 is provided interposed between the top of the block 50 and the cross member 49.

In order to determine the speed of rotation of the cylinder 39 at the time the pencil 52 is making its record, the following timing device is used. In this connection, it will be understood that the complete record is made in less than a tenth of a second and while the approximate surface speed of the cylinder 39 may be known, fluctuations in the motor speed and hence of the cylinder 39 occur, and this knowledge of the approximate speed cannot be relied upon. The timing device which I have provided gives the exact surface speed of the rotating cylinder 39 during the making of the record.

The timing device which I have devised includes two upright, spaced, rigid guiding rods 69—70 carried in a U-shaped plate 71 secured to the bottom plate 34, the rods 69—70 being mounted on the inner faces of the arms of the U-shaped plate 71 and extending through recesses 72—72 cut in the plate 34 and member 32. The upper ends of the rods 69—70 are connected by cross piece 73 which is secured thereto by nuts 74. (See Fig. 16). The rods 69—70 form guides for a block 75 shown in Figs. 15 and 16 and the cross section of which is indicated by the dotted lines in Fig. 10. From the latter figure, it will be seen that there are only line contacts between the block 75 and the guiding rods 69 and 70, so that the amount of friction between the same when the block 75 falls, as hereinafter described, is practically negligible. At its upper end the block 75 is provided with a shoulder 76 under which is adapted to engage a shouldered hook 77 pivotally mounted as indicated at 78, the hook 77 constituting one arm of a bell crank lever, the other arm of which is indicated at 79. The guide rod 69 is hollow and has slidably mounted therein a trip rod 80, which, at its lower end is provided with a rack 81, (see Fig. 9), with which rack coöperates a pinion 82 mounted in the table 43, the inner end of said pinion 82 having a second pinion 83 with which coöperates a slidable rack 84 formed on the inner end of the rod 85. The rod 85 is operated by a knob 86 at its outer end as clearly indicated in Fig. 9. A weight 87 is secured to the bottom of the block 75 to thereby increase the momentum of the falling body when it is released, as hereinafter described, and minimize any possible effects of friction and by reducing the proportion of the surface of the falling body subject to air resistance.

The normal position of the falling body constituted by the block 75 and weight 87 is as shown most clearly in Fig. 5. To release the weight and permit it to fall under the influence of gravity, the knob 86 is pushed inwardly as indicated by the arrow $a$ which, through the mechanism hereinbefore described, will actuate the lever 77—79 and release the weight. To cushion the falling weight 75—87 after it has performed its function as hereinafter described, I provide a shock absorber comprising a portable standard 88 in which is telescopically mounted a spring controlled plunger 89. The portable standard 88 is entirely separate from the rest of the recording mechanism and is placed on the floor of the laboratory beneath the guide rods 69—70 to catch the falling weight. In this way any jar or vibration due to the stopping of the falling body is prevented from being transmitted to the recording mechanism.

Pivotally mounted in the block 75 is a lever 90 which carries a pencil 91, the position of the lever and pencil in the block 75 being normally as indicated most clearly in Fig. 15, the lever 90 being under the influence of a coil spring 92. By referring to Figs. 14 and 15, it will be seen that the guiding rod 70 is provided with a cam 93 at a point opposite the rotating cylinder 39 and near the top thereof. The spring controlled lever 90 carries a finger 94 which is adapted to be actuated by the cam 93 while the falling body is passing the rotating cylinder.

The foregoing arrangement is such that, as the falling body carrying the pencil 91 passes the rotating cylinder, the pencil will be forced against the record strip of paper on the cylinder and make a mark as indicated at $y$ on the diagram shown in Fig. 18. The movements of the pencil 91 can be followed by referring to Fig. 15 where the dotted circles 194—194 show three positions of the finger 94 in engagement with the cam 93.

In Fig. 17 is shown a detail of a structure for mounting the pencils 52 and 91, the lead 95 being carried by a split sleeve 96 having a collar 97 thereon with which engages one end of a spring 98, the other end of the spring engaging the inner wall of the cylindrical end 99 of the lever which carries the pencil. To adjust the tension of the spring and also to grip the lead, an adjustable nut 100 is threaded onto the split sleeve 96.

On top of the table 43 are mounted two switches 101 and 102, the former being in the circuit controlling the electromagnet 23 and the latter in the circuit which controls the motor 35, as clearly appears from the wiring diagram in Fig. 19.

The acceleration of a falling body under the influence of gravity is, of course, a known and constant quantity. Hence the speed of a falling body at any portion of its flight can be mathematically ascertained and the time required to pass any two given points may be similarly ascertained. In the present construction I have located the cam 93 so that the pencil 91 will record the movement of the falling weight for approximately 2 inches, this portion of the weight's fall overlapping two points which the pencil passes over during 0.01 of a second, that is, while the weight is passing through its 15th inch and $16\frac{1}{12}$ inches in its fall. During this period of its fall I have calculated that the falling body will traverse theoretically a space of $1\frac{1}{12}$ or 1.0833 inches in 0.01 of a second. By actual experiment conducted with the apparatus hereinbefore described, I have determined that the friction and air resistance decrease the actual space traversed to 1.05 inches, in 0.01 of a second. Hence, intersecting the diagonal record time line $y$ by two horizontal lines as indicated at $h$—$h$ in Fig. 18 which are 1.05 inches apart and at the predetermined points in the fall of the body, the projected horizontal distance between the points of intersection which is indicated by the dimension $b$, will give the absolute surface speed of the rotating cylinder and record sheet. In other words, the distance $b$ is the actual distance traveled by the surface of the rotating cylinder in 0.01 of a second.

The weight of the drop hammer employed is 9,000 pounds and experiments have shown that the forces acting against the hammer in bringing it to rest in draft gear tests are sometimes 200 times this. This is taken into account in calculating the required strength of the springs 51—51 for controlling the block or crosshead 50 which carries the pencil 52, in avoiding possible separation of the cap 58 from the striking plate 59 by rate of deceleration.

The record is made in the following manner:

After the gear to be tested has been put in place, the drop hammer 12 is lowered to the point where it first engages the gear or follower plate, if one is placed thereon. If the total possible movement of the gear being tested is 3 inches, the various associated parts of the recording mechanism are so adjusted that when the drop hammer is in the position above described the striking plate 59 will have depressed the rod 57 and hence the pencil 52 to a level which is 3 inches, plus a half inch clearance, above the lowest point to which the crosshead can descend. In other words, the adjustment is so arranged that the record will be made while the springs 51 are under their maximum working tension. With the adjustment made as above indicated and the drop hammer 12 just touching the gear, in which position the pencil 52 will be freed from the cam 55, the frame 47 which carries this pencil is then pulled toward the rotating cylinder by pulling the knob 46 in the direction indicated by the arrow $c$ in Fig. 9, it being understood that the motor 35 is previously started by turning the switch 102. This brings the pencil 52 into engagement with the record strip and a base line is thereby made such as indicated in Fig. 18 by the reference $z$.

From the foregoing description, it will be seen that the base line $z$ corresponds to the initial engagement of the weight or hammer with the gear, or, in other words, at the instant the actuation of the gear commences. The base line of the record having thus been established, the frame 47 is pushed away from the cylinder, the weight or hammer 12 raised to the desired number of inches above the gear, and the block or crosshead 50 is then lifted to its highest position under the influence of the springs 51. The frame 47 is then drawn inwardly by pulling the knob 46 but the pencil 52 will not engage the record strip since it is held in retracted position by the cam 55. The weight 75—87 being in its uppermost position, the record is then ready to be made. The operator simultaneously opens the switch 101, thereby deënergizing the magnet 23 and releasing the weight 12 and pushes the knob 86 which releases the weight 75—87. The falling 9000 pound hammer 12 will have its movements recorded by the pencil 52 as shown by the line $x$ and at the same time during the recording of said line $x$, the pencil 91 will record the speed of the falling body 75—87, as indicated by the line $y$. The instant the record has been made, the operator pushes the knob 46 inwardly thus disengaging the pencil 52 from the record strip and preventing unnecessary markings on the record strip.

Fig. 18 represents an actual diagram or record made with my improvement, the record being that of a friction gear of the general type illustrated in my said Patent 1,065,070. After the record is made the cylindrical paper tube is taken off of the cylinder 39 and cut so that it may be laid out in a plane. In reading the record, the surface speed is obtained in the manner heretofore described, the distance $b$ representing the amount actually traveled in 0.01 of a second. The line $x$ from the point $d$ to $e$ indicates the retardation or negative acceleration of the hammer 12 from the time it first strikes the gear until the speed has been brought to zero; from the point $e$ until the line $x$ merges into the nearly horizontal line as indicated at $f$, indicates the return or recovery of the gear after the striking of the blow. Knowing the weight of the falling body 12, the surface speed of the record strip and the tangent to the line $x$ at any point thereof, the force acting against the weight at that instant can be readily determined. In other words, the force which the gear exerts at any point during its actuation and also the total maximum force can be ascertained. If the line $x$ were straight throughout its length, it is apparent that the retarding force acting upon the falling weight or drop hammer 12 would just equal the force of gravitation.

It is the change in direction in the line $x$ in any unit of time, that indicates the rate of deceleration and from which the force can be calculated.

By making records of the performance of a gear with varying drops of the hammer 12, its performance under any blow can be ascertained. Similarly, by making records of different types of gears, comparisons may be made of their performance under varying conditions.

I have herein shown and described what I now consider the preferred embodiment of my invention, but I am aware that many changes and modifications may be made in the details of construction and arrangement of parts without departing from the spirit of the invention, and I contemplate all such changes and modifications as come within the scope of the claims appended hereto.

I claim:

1. In mechanism of the character described, the combination with a drop weight adapted to strike on a yieldable cushioning mechanism, of means operated by said weight for recording the deceleration thereof during the blow delivered to the cushioning mechanism.

2. In mechanism of the character described, the combination with a drop hammer and automatically operated means for recording the movement of said hammer, of a gravity controlled timing device.

3. In mechanism of the character described, the combination with automatically operated recording means including a movable member for carrying a recording strip, of a gravity controlled timing device to indicate the speed of said movable member.

4. The combination with a recording mechanism including a movable member for carrying a recording strip, of a device for timing the movement of said member, said device including a falling body and means for registering its rate of travel during a predetermined portion of its fall.

5. The combination with a movable strip, of a body adapted to be released and fall under the influence of gravity and a recording instrumentality associated with said body and arranged to operate with said record strip when said body is falling during a predetermined period of its fall, to thereby determine the speed of travel of said strip.

6. The combination with a rotatable recording cylinder, of a body adapted to be released from a height and to fall freely, a marking instrumentality movable with said body and automatically operated means for forcing said instrumentality into coöperative engagement with said cylinder at a predetermined point in the fall of said body.

7. The combination with a movable member of a recording mechanism, of means for determining the speed of movement of said member, said means including a gravity controlled body and devices for registering its movements while falling and under the influence of gravity.

8. The combination with a drop hammer adapted to be brought to rest in its falling movement by a shock absorbing device, of means for recording the rate of deceleration of said hammer while being brought to rest by said device.

9. The combination with a drop hammer adapted to be brought to rest in its falling movement by a shock absorbing device, of means for recording the rate of deceleration of said hammer while being brought to rest by said device, said means including a marking element and a member carried by said hammer for actuating said marking element.

10. The combination with a drop hammer adapted to be brought to rest in its falling movement by a shock absorbing device, of means for recording the rate of deceleration of said hammer while being brought to rest by said device, said means including a slidably mounted block carrying a marking device and a member carried directly by said hammer for actuating said block and moving it in unison with the hammer during the latter's deceleration.

11. The combination with a drop hammer adapted to fall upon and be brought to rest by a shock absorbing device, and means for indicating the movements of said hammer while being acted upon by said device, of a timing device which includes a falling weight.

12. The combination with a drop hammer adapted to fall upon and be brought to rest by a shock absorbing device, and means for indicating the movements of said hammer while being acted upon by said device, of a timing device which includes a falling weight, the timing device making its record simultaneously with that made by said means.

13. In a mechanism of the character described, a timing device including, a movable member carrying a record strip, a weight adapted to fall from a point above said strip, and a marking element carried by said weight and arranged to coöperate with said strip while passing the latter.

14. In a mechanism of the character described, the combination with a rotatable record strip, of a weight adapted to be released from a point above said strip and to fall under the influence of gravity, and a marking element carried by said weight and arranged to coöperate with said strip while said element is moving past said strip.

15. In a mechanism of the character described, a timing device comprising a rotatable cylinder arranged to carry a recording paper, of a weight arranged to fall from a point above said cylinder, and a pencil carried by said weight arranged to be actuated to engage said strip while passing the latter.

16. In a recording mechanism, the combination with a cylinder rotatable about a vertical axis, of a weight, a support for holding said weight at a point above said cylinder, a marking element carried by said weight, means for releasing said weight to permit it to fall under the influence of gravity, and means for actuating said marking element into engagement with a recording medium on said cylinder as said element falls past said cylinder.

17. In a mechanism of the character described, the combination with a drop hammer adapted to be let fall upon a shock absorbing device, and a member carried by said hammer, of a recording device including a movable member carrying a recording medium, and a member adjacent thereto carrying a marking element, said last named member being actuated by said member carried by the drop hammer.

18. In a mechanism of the character described, the combination with a drop hammer adapted to be brought to rest in its fall by a shock absorbing device and a striking plate carried by and movable in unison with said hammer, of a movable record strip, a slidable crosshead adjacent said strip, said crosshead carrying a marking element arranged to engage said strip, said striking plate actuating said crosshead while the drop hammer is being acted upon by said shock absorbing device.

19. In a mechanism of the character described, the combination with a drop hammer adapted to be brought to rest in its fall by a shock absorbing device, and a striking plate carried by said hammer, of a rotating cylinder arranged to carry a record strip, a vertically slidable crosshead adjacent said cylinder, a marking element carried by said crosshead adapted to engage the strip, and a plunger connected with said crosshead, said plunger being actuated by said striking plate when the drop hammer is being acted upon by the shock absorbing device.

20. In a mechanism of the character described, the combination with a drop hammer adapted to be arrested in its falling movement by a draft gear, of a striking plate adjustably mounted on said hammer, of a rotatable cylinder arranged to carry a record strip of paper, a vertically slidable spring-controlled crosshead adjacent said cylinder, a pencil carried by said crosshead and adapted to engage said paper, and a plunger connected with said crosshead and located in the path of travel of said striking plate whereby the latter actuates the crosshead.

21. In a mechanism of the character described, the combination with a drop hammer and a draft gear upon which the drop hammer is adapted to fall and be brought to rest, of means for directly recording the deceleration of said drop hammer while in engagement with said gear, and a timing device associated with said recording means.

22. In a mechanism of the character described, the combination with a drop hammer adapted to fall upon and be brought to rest by a draft gear, and a striking plate carried by said hammer, of a rotatable cylinder arranged to carry a record strip, a marking element coöperatively associated with said cylinder and strip, means for actuating said element by the hammer when the latter is in engagement with the shock absorbing device, and a weight adapted to fall under the influence of gravity, said weight being also provided with a marking element arranged to coöperate with said strip to indicate the speed of travel of the falling weight during a portion of its flight.

23. In a mechanism of the character described, a rotatable cylinder, a record strip carried thereby, two vertically movable pencils each of which is adapted to engage said strip during a portion of its vertical movement, one of said pencils being adapted to be actuated by a weight falling under the influence of gravity and the other by a second moving weight acted upon by a shock absorbing device.

24. In a mechanism of the character described, the combination with a drop hammer adapted to be brought to rest in its fall by a shock absorbing device, of a rotatable cylinder, a spring-controlled vertically slidable block carrying a marking element coöperable with said cylinder, means for moving said block from said hammer while the latter is in engagement with the shock absorbing device and a weight adapted to be let fall under the influence of gravity from a point above said cylinder, said weight carrying a marking element also coöperable with said cylinder.

25. In mechanism of the character described, the combination with a relatively heavy member mounted so as to be capable of acceleration and to strike a heavy blow on a shock absorbing mechanism, of means for recording the change of speed of said member while a blow is being delivered to the shock absorbing mechanism, said means including a rapidly moving recording surface, a stylus for engagement therewith, and devices interposed between said member and said stylus for actuating the latter over the recording surface.

26. In a recording mechanism, the combination with a relatively heavy member mounted so as to be capable of acceleration and deceleration, of a recording device associated with said member, including a rapidly moving recording surface, a stylus coöperable therewith for relatively short intervals of time, and means, operated from said member while the latter is undergoing a change of speed, for actuating the stylus into coöperative engagement with said recording surface, to thereby record the rate of speed change of said member during the short intervals of time.

27. In mechanism of the character described, the combination with a relatively heavy member mounted so as to be capable of acceleration and deceleration, of a recording device associated with said member, said device including a recording surface rapidly movable in a line transverse to the line of movement of said member, a stylus coöperable with said surface and movable in a line parallel to the movement of said member, and means, operated from said member while the latter is undergoing a change of speed, for actuating said stylus into operative engagement with said recording surface.

In witness that I claim the foregoing I have hereunto subscribed my name this 30th day of June, 1915.

JOHN F. O'CONNOR.

Witness:
JOSEPH HARRIS.